United States Patent
Harrison

[11] Patent Number: 4,729,285
[45] Date of Patent: Mar. 8, 1988

[54] CONTROL VALVE FOR A VACUUM BRAKE BOOSTER

[75] Inventor: Gregory K. Harrison, South Bend, Ind.

[73] Assignee: Allied Corporation, Morristown, N.J.

[21] Appl. No.: 882,985

[22] Filed: Jul. 7, 1986

[51] Int. Cl.$^4$ .............................................. F15B 9/10
[52] U.S. Cl. ................................. 91/369 A; 91/376 R
[58] Field of Search ............ 91/369 R, 369 A, 369 C, 91/376 R

[56] References Cited

U.S. PATENT DOCUMENTS

| | | | |
|---|---|---|---|
| 3,452,646 | 7/1969 | Abbott et al. | 91/369 A X |
| 4,256,016 | 3/1981 | Thomas | 91/369 A |
| 4,487,105 | 12/1984 | Harrison | 91/376 R X |
| 4,522,031 | 6/1985 | Kytta et al. | 91/369 A X |

FOREIGN PATENT DOCUMENTS

| | | | |
|---|---|---|---|
| 2064690 | 6/1981 | United Kingdom | 91/369 C |
| 2065809 | 7/1981 | United Kingdom | 91/369 C |

Primary Examiner—Robert E. Garrett
Assistant Examiner—Mark A. Williamson
Attorney, Agent, or Firm—Leo H. McCormick, Jr.; Ken C. Decker

[57] ABSTRACT

A brake booster (42) having a hub (78) with control valve (56) located therein. The control valve (56) has a plunger (106) connected to an output rod (62) through a reaction disc (60) and to a brake pedal. A sleeve (112) which surrounds the plunger (106) is urged toward a shoulder (110) on the plunger (106) by a first resilient member (112). An input applied to the brake pedal moves the plunger (106) to allow air to enter into the booster (42) and create an operational pressure differential across a movable wall (50) to develop an output force. The output force is carried through the reaction disc (60) and a reaction force is carried through the plunger (106) to balance the input force. On termination of the input force, the reaction force and first resilient means (126) move the plunger (106) to define a gap between an annular seat (102) and a poppet (117) member to allow vacuum to evacuate air from the booster (42). When a return spring (59) moves the wall (58) to the rest position, the stop (128) engages the booster (42) housing and holds the sleeve (112) stationary. The reaction force continues to sustain the gap until the operational pressure differential is eliminated. Thereafter a static pressure differential acts on the poppet member (117) and overcomes a reaction disc (60) resistance to move the plunger toward the annular seat to define a rest position for the plunger (106).

8 Claims, 7 Drawing Figures

FIG. I

CONTROL VALVE FOR A VACUUM BRAKE BOOSTER

BACKGROUND OF THE INVENTION

This invention relates to a control valve for a vacuum brake booster. The control valve has a plunger which is urged to a rest position adjacent an annular valve seat by a static pressure differential created across the plunger and a poppet member. A resiliently positioned sleeve concentric to said plunger delays the movement of the plunger by the static pressure differential until after an operational pressure differential in the vacuum brake booster has been terminated.

In my earlier U.S. Pat. No. 4,487,105, I disclosed a control valve which is moved from a fully released position to a rest position by a static pressure differential to reduce the distance required for an input member to move a control valve in response to an imput force in effecting a brake application. Under some operating conditions, it has been found that the movement of the control valve by this static pressure differential occurs prior to the complete termination of the operational pressure differential developed during a prior brake application. Under such circumstances, the termination of the operational pressure differential is delayed and as a result the retraction of the brake lining or pad with respect to a corresponding rotor or drum is also delayed.

As disclosed in both U.S. Pat. Nos. 4,487,105 and 4,562,696, a key member which engages the wall of a housing can be used to establish the relationship between the annular seat and plunger. However, if an operational pressure differential has not been terminated prior to the positioning of the plunger by the key member, a similar delay can also occur in the termination of the operational pressure differential since a limited flow path is established through which air can be evacuated from the rear chamber by way of the control valve to the front chamber.

The control valve structure disclosed in U.S. Pat. No. 4,358,990 discloses the relationship between a valve seat and poppet member which changes as a function of the retraction forces would not appear to solve the early movement of the plunger to a position adjacent the valve seat as the wall is returned to the rest position since the poppet member position is tied to the wall position.

SUMMARY OF THE INVENTION

In the vacuum brake booster disclosed in this invention, a control valve located in a hub member has a bore with a plunger located therein. The plunger has a first end which engages a reaction disc and a second end connected to a brake pedal. A sleeve surrounds the plunger and is urged toward a shoulder thereon by a first resilient member. A stop member carried by the hub member has a first end that extends into the bore and a second end that extends from the hub. In response to an input force applied to the brake pedal, the plunger moves to allow a free end of a poppet to engage an annular seat and on initial movement interrupt vacuum communication between the first and second operational chambers in the vacuum booster. On further movement of the plunger, air enters the second operational chamber and creates an operational pressure differential across a wall. The operational pressure differential acts on and moves the wall to supply an output force to a member by way of the reaction disc. The reaction disc transmits a reaction force to the plunger to balance the input force applied to the brake pedal. On termination of the input force, the reaction force and first resilient means move the plunger toward the brake pedal to initiate vacuum communication between the first and second chamber. The sleeve engages the first end of the stop means, however, the reaction force transmitted through the reaction disc continues to move the plunger until a retainer is engaged to define a first gap or retraction positions between the annular seat and free end of the poppet member. As air is evacuated from the second chamber, the operational pressure differential is reduced such that a return spring moves the wall toward the rear housing of the brake booster. When the second end of the stop means engages the housing, the sleeve is held stationary while the return spring continues to move the wall toward the stop means. The reaction force sustains the relationship between the annular seat and free end of the poppet until the operational pressure differential is completely terminated. Thereafter, a static pressure differential created across the plunger and poppet member overcomes the internal resiliency of a projection on the reaction disc and moves the plunger and free end of the poppet toward the annular seat to establish the ready position for the control valve.

An advantage of the control valve of this invention occurs since the operational pressure differential produced across a movable wall is substantially eliminated prior to the development of a static pressure differential which moves the control valve to a ready position.

A further advantage of the control valve structure of this invention occurs through the movement of a sleeve into engagement with a stop member by a spring to establish a flow path between an annular seat and the free end of a poppet member. The spring acting through the sleeve holds the plunger and poppet away from the annular seat to assure that the flow path is maintained even if the pressure differential is terminated by the time the return spring moves the movable wall to its rest position. Prior to the movable wall reaching its rest position, the stop holds the sleeve stationary to allow a static pressure differential to overcome the forces acting on the plunger during the return of the wall to the rest position. The static pressure differential moves the plunger toward the annular seat and establishes a ready position for the plunger to thereby reduce the brake pedal travel for a succeeding brake application.

It is an object of this invention to provide a vacuum brake booster with a control valve having: a ready; a lap; an actuation; and a release position with structure that prevents a plunger from moving from the release position to the ready position prior to the termination of the operational pressure differential created during a brake application and only after a static pressure differential is created across the plunger.

These advantages and objects should be apparent from reading this specification while viewing the drawings.

DETAILED DESCRIPTION OF THE INVENTION

Figure 1:
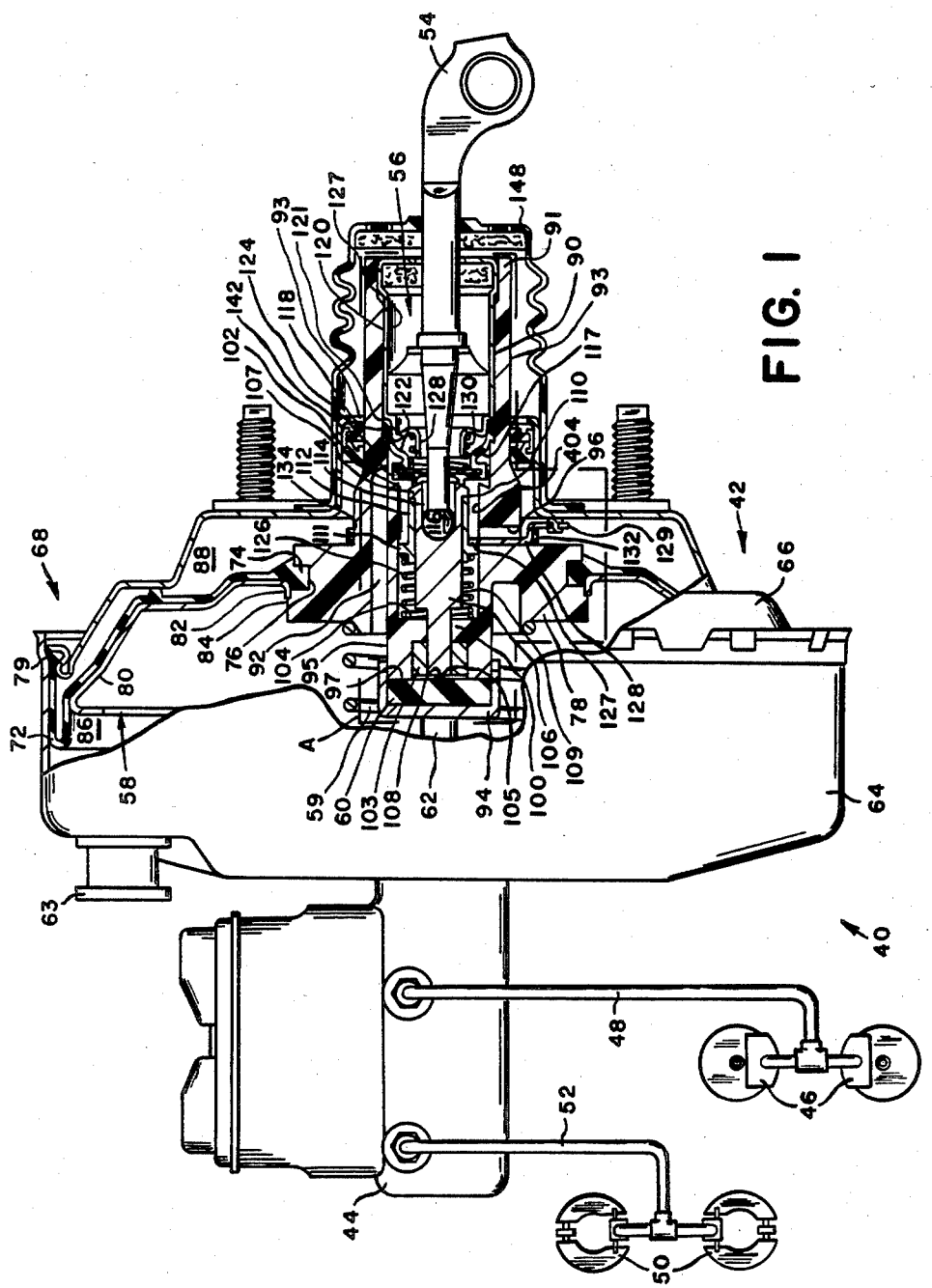
FIG. 1 is a schematic illustration of a brake system with a sectional view of a vacuum brake booster made according to the principals of this invention.

The brake system 40 shown in FIG. 1 has a power assist servomotor 42 connected to a master cylinder 44. The master cylinder 44 is connected to the front brakes 46 by a conduit 48 and to the rear brake 50 by a conduit 52. In response to an input force applied to push rod 54 by a brake pedal, control valve 56 is moved from its rest position through a lap position and into an actuation position whereby an operational pressure differential is created across a movable wall 58 in servomotor 42. The operational pressure differential acts on the movable wall 58 to develop an output force that is transmitted through disc 60 into push rod 62. The output force moves the wall 58 and push rod 62 to provide master cylinder 44, of a type fully disclosed in U.S. Pat. No. 3,818,706, with an operational force that pressurizes fluid to provide the front and rear brakes 48 and 50 with a force to effect a brake application corresponding to the input force applied to push rod 54. On termination of the input force, return spring 59 urges the movable wall 58 towards the rest position as the pressure differential dissipates.

In more particular detail, the servomotor 42 shown in FIG. 1, has a housing formed by a front shell 64 connected to a rear shell 66 by a lock arrangement 68. The lock arrangement 68 holds a first bead 79 of diaphragm 72 between the ends of the front and rear shells 64 and 66.

The diaphragm 72 which is part of the movable wall 58 has a bead 74, which holds flange 82 of backing plate 80 against shoulder 84. Bead 74 snaps into groove 76 on hub 78 to separate a resulting front chamber 86 from a rear chamber 88. Hub 78 has a rearward projection 91 that extends through opening 93 in the rear shell 66. Hub 78 has an axial bore 90 with a passage 92 connected to front chamber 86 and passages or slot 96 connected to rear chamber 88. An annular flange 94 on push rod 62, which encapsulates reaction disc 60, surrounds a forward projection 95 on hub 78. The face 97 on projection 95 engages the reaction disc 60 to form a link between the movable wall 58 and output push rod 60. Hub 78 has a land 100 which acts as a guide and bearing surface for plunger 106 and a shoulder 102 located between passage 92 and slot or passage 96 which forms a vacuum seat for control valve 56.

Control valve 56 which is located in bore 90 of projection 91 includes a plunger 106. Plunger 106 has a first end 105 and a second end 107. The first end 105 engages projection 108 that extends from reaction disc 60 and the second end 107 has a socket 114 which receives ball 116 on the end of push rod 54 connected to the brake pedal. Plunger 106 has a cylindrical surface 109 with a shoulder 110 located thereon between the first end 105 and second end 107. A sleeve 112 which is concentrically located on cylindrical surface 109 has a flange or rib 111 that slidably engages bore 90. A spring 126 located between shoulder 104 and rib 111 urges sleeve 112 toward the shoulder 110 on plunger 106.

A poppet member 117 has a first end 118 fixed in projection 91 by groove 121 on retainer 120, a flexible body 122 and an end 124 free to move within bore 90. Retainer 120 has a first cylindrical section 127 that engages projection 91 to provide support thereto and a smaller second cylindrical section 128. The smaller second cylindrical section 128 forms a guide for holding a second spring 130 in alignment with the free end 124 of poppet member 117. Spring 126, which acts on plunger 106 through sleeve 112, urges atmospheric seat formed by the semi-special surface on end 107 toward the free end 124 on poppet member 117 which in turn is urged toward the end 107 by spring 130 to separate that portion of bore 90 between passage 92 and 96 from the remainder thereof which is connected to the surrounding environment.

Plunger 106 is retained in bore 90 by disc 103 which is fixed to end 105. A stop member 128 located in slot 96 has a first end 127 that extends into bore 90 and a second end 129 that is offset from the first end 127 and extends from slot 96. A split ring 132 located in groove 134 on hub 78 engages the stop member 128 and holds the same in slot 96.

A boot 148 attached to the rear shell 66 surrounds projection 91 to prevent contaminants from scoring either seal 142 or the peripheral surface 93 on projection 91 such that a leak path could be produced between chamber 88 and the surrounding environment.

Figure 2:
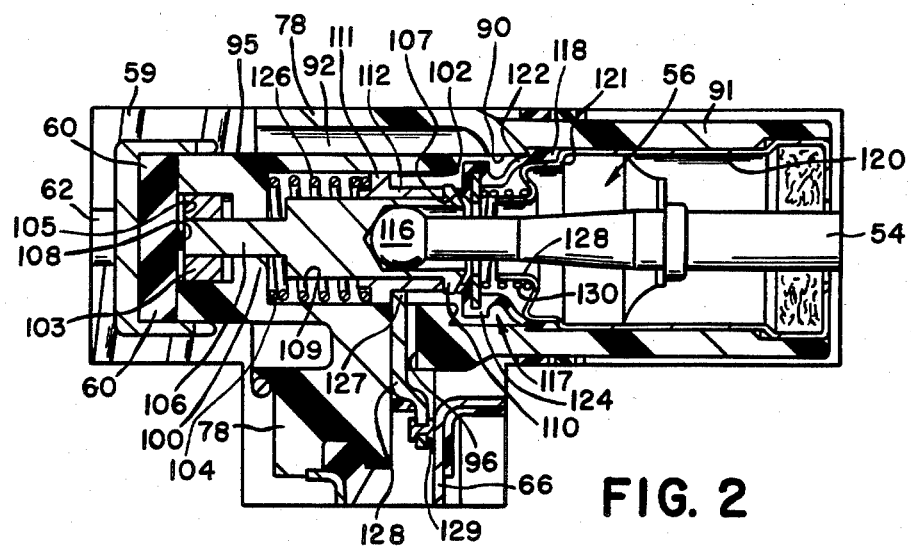
FIG. 2 is an enlarged sectional view of the control valve of the servomotor circumscribed by area A in FIG. 1, showing the control valve in a ready position.

The control valve 56 shown in FIGS. 1 and 2 is in a rest or ready position located adjacent the lap position. In the ready position, vacuum from a source is communicated through check valve 63 into chamber 86 to evacuate air from chamber 88 by way of passage 96, that portion of bore 90 between vacuum seat 102 and passage or slot 96, a gap formed between atmospheric seat 102 and the free end 124 of poppet 117, and passage 92.

Figure 3:
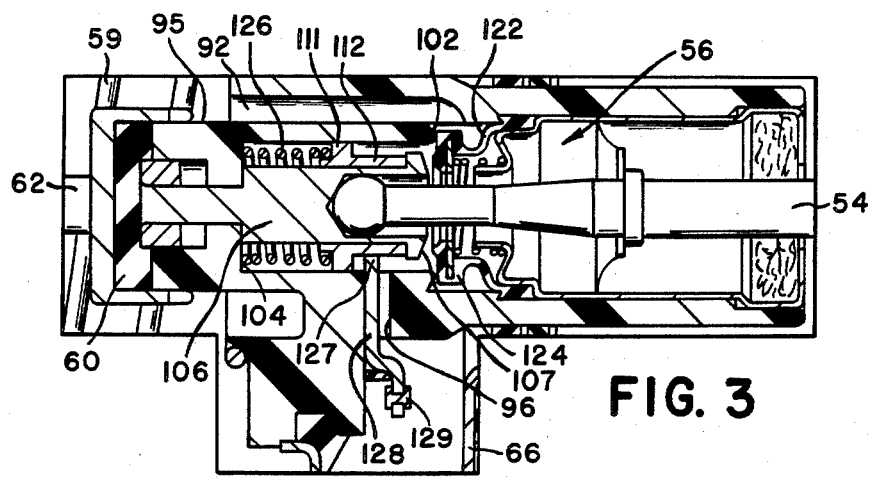
FIG. 3 is an enlarged sectional view of the control valve of the servomotor circumscribed by area A in FIG. 1, showing the control valve in an actuation position.

In response to an input force on push rod 54, plunger 106 moves toward disc 60 by overcoming the resiliency of projection 108. On initial movement of plunger 106, spring 130 moves free end 124 of poppet member 117 into contact with vacuum seat 102 to interrupt communication through passage 92 into bore 90. Further movement of plunger 106 moves face on end 107 away from free end 124 as shown in FIG. 3 to allow air present in bore 90 to flow through opening 123 into chamber 88 by way of passage or slot 96. With air in chamber 88 and vacuum present in chamber 86 a pressure differential is created across wall 58. This pressure differential acts on diaphragm 72 and backing plate 80 to develop an output force that is transmitted through shoulder 84 into hub 78 for distribution by face 97 on end 95 into disc 60. The resistance to movement of push rod 62 by the development of a hydraulic pressure in the master cylinder 44 to effect a brake application is transmitted through disc 60 into end 105 of plunger 106 for balancing the input force applied to end 107 by push rod 54.

On termination of the input force acting on push rod 54, reactionary forces in reaction disc 60 and the resilient force of spring 126 move plunger 106 to position the end or seat on end 107 on the free end 124 of poppet member 117 and interrupt the communication of air from in bore 90 to chamber 88. The reactionary force and spring 126 thereafter move plunger 106 such that free end 124 of poppet member 117 moves away from seat 102 to allow vacuum present in chamber 86 to evacuate air from chamber 88. As air is evacuated from chamber 88, the operational pressure differential across wall 58 is reduced to allow spring 59 to move wall 58 toward the rear shell 66.

Figure 4:
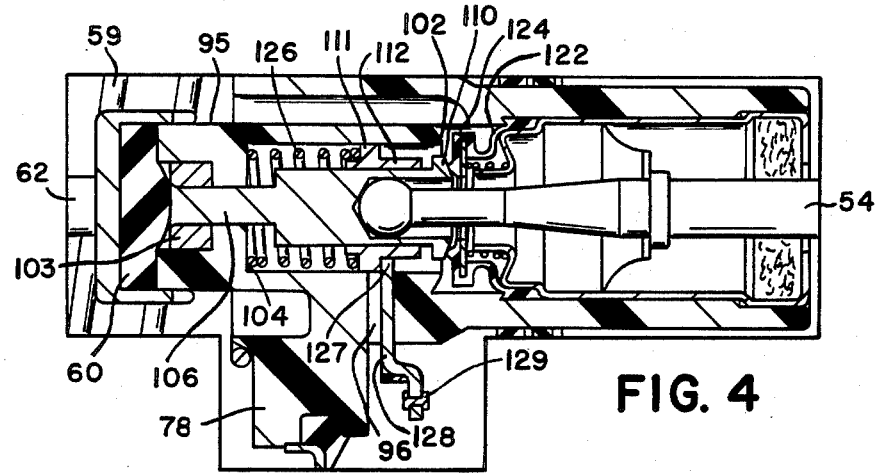
FIG. 4 is an enlarged sectional view of the control valve of the servomotor circumscribed by area A in FIG. 1 showing the control valve in a fully released position.

Spring 126 acting through shoulder 111 moves sleeve 112 with plunger 106 and engages stop member 128. Thereafter, spring 126 acting through sleeve 112 moves the stop member 128 in slot 96 until the stop member 128 engages the bottom of the slot 96. The reactionary force acting through disc 60 continues to independently move plunger 106 and establish a large gap between vacuum seat 102 and free end 124 as shoulder 110 has moved away from sleeve 112, as shown in FIG. 4. The gap between seat 102 and the free end 124 of poppet member 117 is totally dependent on the reactionary forces transmitted through disc 60. Spring 126 acting through sleeve 112 holds stop member 128 against the bottom of slot 96 to assure that the gap is at least equal to the length of slot 96 during the return of wall 58 toward shell 66 by spring 59.

Figure 5:
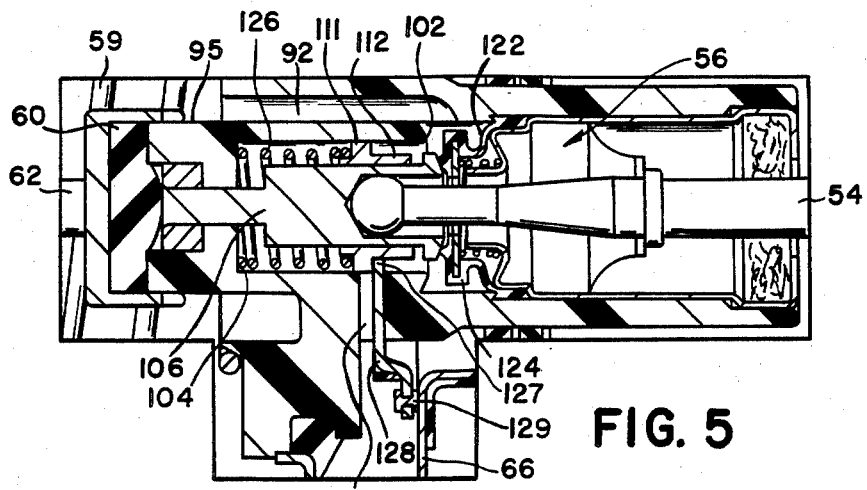
FIG. 5 is an enlarged sectional view of the control valve of the servomotor circumscribed by area A in FIG. 1 with the control valve in a released position and initial engagement of a stop member with the rear shell of the servomotor housing.
Figure 6:
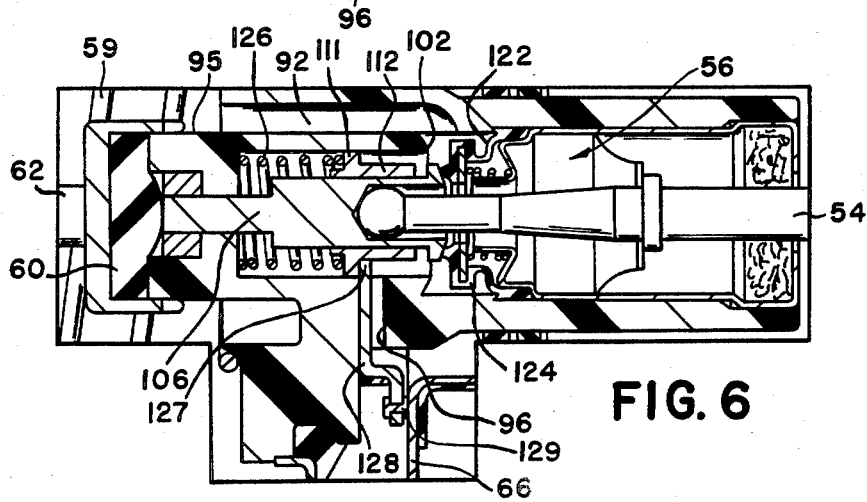
FIG. 6 is an enlarged sectional view of the control valve of the servomotor circumscribed by area A in FIG. 1 showing the control valve in a fully released position with the hub member positioned against the rear shell by a return spring.

When wall 58 approaches shell 66, end 129 on stop member 128 engages shell 66, as shown in FIG. 5, and holds the stop member 128 and sleeve 112 stationary. Thereafter, slot 96 allows the return spring 59 to continue to move wall 58 toward shell 66 until hub 78 engages stop member 128 to establish the rest position for wall 58. If the pressure differential has not been eliminated, plunger 106 remains in the position shown in FIG. 6 with a large gap between seat 102 and free end 124.

When the vacuum in chamber 86 has finally established equal pressure on both sides of wall 58 in chambers 86 and 88, projection 108 on reaction disc 60 retains the plunger 106 in this fully retracted position until a static pressure differential develops across poppet member 117 and plunger 106 by the vacuum present in portion 404 of bore 90 and air in bore 90. The static pressure differential develops at a rate which is substantially the inverse of the elimination of the operational pressure differential. When the static pressure differential is sufficient to overcome the internal resistance of the projection 108 on reaction disc 60, plunger 106 moves to the ready position shown in FIGS. 1 and 2.

In the vacuum brake booster 42, the control valve structure 56 and the operational relationship between sleeve 112 and plunger 106 is such that a fixed gap equal to the length of slot 96 is present between a vacuum seat 102 and free end 124 of a poppet member 117 during the return of a wall 58 toward the rear shell 66 until stop member 128 engages wall 66. If the pressure differential across wall 58 has not been significantly reduced and still exists, the internal resiliency of reaction disc 60 sustains this relative large gap to assure that vacuum in chamber 86 and present in passage 92 has substantially evacuated all the air from chamber 88 before allowing plunger 106 to move to the ready position. Thus, until the operational pressure differential across wall 58 is substantially eliminated and the static pressure differential developed to a level to overcome the internal resiliency of reaction disc 60, plunger 106 remains stationary. Thereafter, the static pressure differential moves the plunger 106 into engagement with the sleeve 112 to establish a ready position with a minimum gap between seat 102 and free end 124 of poppet member 122.

Figure 7:
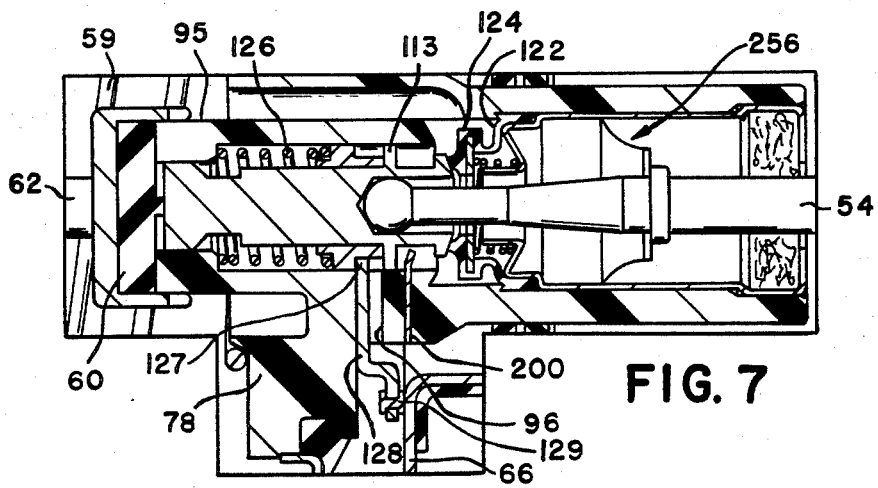
FIG. 7 is another embodiment of a control valve for use in the servomotor of FIG. 1 wherein the plunger is retained in the hub by a key member.

During the manufacture of the vacuum brake booster 42, the attachment of disc 103 to the end 105 of plunger is achieved through a staking operation. Since a primary function of disc 103 is to retain plunger 106 in housing or hub 78 and thereby establish the maximum distance that reaction disc 60 is allowed to move the free end 124 away from vacuum seat 102, different ways of holding the plunger 106 in hub 78 were studied. It was determined a key 200 inserted into hub 78 would hold plunger 106 in hub 78 as shown in FIG. 7 would allow reaction disc 60 to function in the same manner to establish the gap between seat 102 and free end 124 of plunger 117 as shown in FIG. 7. The other structural components and functional operation of the control valve 256 is identical to control valve 56 described in the operation of booster 42 in FIG. 1.

The only change in operation of the servomotor 42 occurs after the input force is removed from push rod 45. The reaction forces are still transmitted through disc 60 and into end 105 to move plunger 106 toward a release position. Spring 126 simultaneously moves the sleeve 112 and stop member 128 with the plunger 106 until stop member 128 reaches the bottom of slot 96. The reaction forces continue to move plunger 106 until shoulder 113 engages key 200 to define a maximum gap that is allowable between vacuum seat 102 and the free end 124 of poppet member 117. When the operational pressure differential is eliminated between chambers 86 and 88, by the fluid therein being at the same level, the static pressure differential acting on poppet member 117 and end 107 of plunger 106, develops a force which sufficient to overcome the internal resiliency of the reaction disc 60 as exhibited in projection 108. Thereafter, the static pressure differential moves the plunger 106 to the ready position, as shown in FIG. 7. The other structural components and functional operation of the control valve 256 is identical to control valve 56 described in the operation of booster 42 in FIG. 1.

In conclusion, the control valve structure 56 and 256 prevents premature movement of a plunger 106 to a ready position before the elimination of an operational pressure differential while thereafter allowing a static pressure differential to move plunger 106 and reduce the valve travel required by an operator to move a brake pedal and effect a brake application.

What I claim is:

1. In a brake booster having a housing with a cavity therein, a wall located in said housing for dividing said cavity into first and second chambers, said wall having a hub member with a bore therein, said hub member having a first passage connected to said first chamber and separated from a second passage connected to said second chamber by an annular seat, a control valve located in said bore and selectively positionable in a rest position with respect to said annular seat to allow vacuum present in said first chamber to be freely communicated to said second chamber by way of said first and second passages and a portion of said bore and in an operational position with said annular seat to interrupt vacuum communication through said first passage and initiate communication of air from the surrounding environment by way of said bore and second passage to said second chamber to create an operational pressure differential across said wall, said operational pressure differential acting on said wall and overcoming a return spring to produce an output force in response to an input force, the improvement in said control valve comprising:

a plunger located in said bore and having a cylindrical body with a shoulder located between a first end and a second end, and first end receiving a reaction force corresponding to said output force;

a sleeve member concentric to said cylindrical body;

a first resilient member acting on and urging said sleeve member toward said shoulder on said plunger;

a poppet member located in said bore and having a first end secured to said hub and a second end free to move within said bore;

an input member connected to said second end of said plunger;

stop means located in said second passage having a first end and a second end, said first end engaging said sleeve; and second resilient means for urging said free end of said poppet member into engagement with said second end of said plunger in said rest position and into engagement with said annular seat during said operation position and on termination of said input force, said first resilient member and said reaction force acting on said shoulder and first end of said plunger, respectively, to move said second end of said plunger into engagement with said free end of said poppet member and said free end of the poppet member away from said annular seat to define a first gap between said free end and annular seat to allow said vacuum in said first chamber to evacuate air from said second chamber, said stop means moving in said second passage and engaging said hub to limit the movement of said sleeve within said bore by said first resilient means while said reaction force continues to move said plunger to establish said first gap, said first gap being sustained by the reaction force until said operational pressure differential and reaction force terminates, said air from the environment present in said bore and vacuum present in said portion of said bore creating a static pressure differential across said poppet member, static pressure differential producing a force that acts on said poppet member and plunger to thereafter move said plunger into engagement with said sleeve and thereby define said rest position for said control valve.

2. In the brake booster, as recited in claim 1 wherein said second passage limits the movement of said stop means to correspondingly define a minimum length for said first gap prior to the engagement of said second end of said stop means with said housing on termination of said input force as said return spring moves said wall to its rest position.

3. In the brake booster as recited in claim 1 further including:

a reaction disc located in said hub and having a projection that engages said first end of said plunger, said reaction force being carried through said reaction disc to oppose said input force, said static pressure differential overcoming the internal resistance of said projection in moving said plunger with respect to said sleeve in defining said rest position.

4. In the brake booster as recited in claim 3 wherein said sleeve member and plunger move independent of each other in establishing the relationship of the annular seat and free end of the poppet member to assure that the operational pressure differential terminates prior to the establishment of the gap therebetween for the rest position when the first and second chamber remain in constant communication with each other.

5. In the brake booster as recited in claim 4 wherein said plunger includes:

retention means connected to said first end for limiting the movement of said plunger within said bore to define the maximum gap between said annular seat and free end of said poppet.

6. In the brake booster as recited in claim 5 further including:

a second sleeve member having a first cylindrical section for guiding said second resilient means, a groove for engaging said fixed end of said poppet member and a second cylindrical section for engaging said hub for positioning said second resilient means with said bore and providing structural support for said hub.

7. In the brake booster as recited in claim 4 further including:

key means fixed to said hub for retaining said plunger within said bore.

8. In the brake booster as recited in claim 7 further including:

a second sleeve member having a first cylindrical section for positioning said second resilient means within said bore, a groove for holding said fixed end of said poppet member within said bore and a second cylindrical section for engaging said hub for providing structural support for the hub.

* * * * *